May 4, 1926.

T. E. WHITE

VARIABLE CONDENSER

Filed May 17, 1924

INVENTOR
Thomas E. White
BY
Chamberlain & Newman
ATTORNEYS

May 4, 1926.

T. E. WHITE

VARIABLE CONDENSER

Filed May 17, 1924    2 Sheets-Sheet 2

INVENTOR
Thomas E. White
BY
Chamberlain & Newman
ATTORNEYS

Patented May 4, 1926.

1,583,634

UNITED STATES PATENT OFFICE.

THOMAS E. WHITE, OF WATERBURY, CONNECTICUT.

VARIABLE CONDENSER.

Application filed May 17, 1924. Serial No. 713,906.

*To all whom it may concern:*

Be it known that THOMAS E. WHITE, a citizen of the United States, and resident of Waterbury, in the county of New Haven and State of Connecticut, has invented certain new and useful Improvements in Variable Condensers, of which the following is a specification.

The present invention relates to an improved variable condenser, particularly for radio use, and has for an object to provide a device of this character which may be regulated with a continuously and uniformly increasing or decreasing capacity from its minimum to a given maximum, with extreme accuracy and delicacy of control, so that great selectivity in tuning is possible. With condensers heretofore in use a chart curve showed a relatively great deflection from a straight line characteristic, whereas maximum efficiency is obtained when such curve assumes a straight line; so that a further object is to provide a condenser of such efficiency that its calculated chart curve assumes or very closely approaches a straight line. To this end it is proposed to provide, in the present embodiment of the invention, two movable plate groups adapted to be moved into relation with stationary plates, and a dial for moving them, adapted to make a complete revolution as the plates are moved from their disengaged position to their completely engaged position.

A further object is to provide a condenser of durable construction, and substantially all-metal, permitting the use of thicker smaller-diameter plates with narrow air gaps between them, to increase the efficiency and capacity effect, the capacity varying inversely as the thickness of the gap between the plates.

Any appreciable amount of insulating material or dielectric in the electrostatic field absorbs power and decreases the efficiency of the condenser, and it is a further object therefore to provide a structure in which the amount of insulation material employed is negligible, so that loss of power and efficiency from this cause is substantially eliminated.

With the above and other objects in view, embodiments of the invention are shown in the accompanying drawings, and these embodiments will be hereinafter more fully described with reference thereto, and the invention will be finally pointed out in the claims.

In the drawings.

Similar reference characters indicate corresponding parts throughout the several figures of the drawings.

Figure 1:
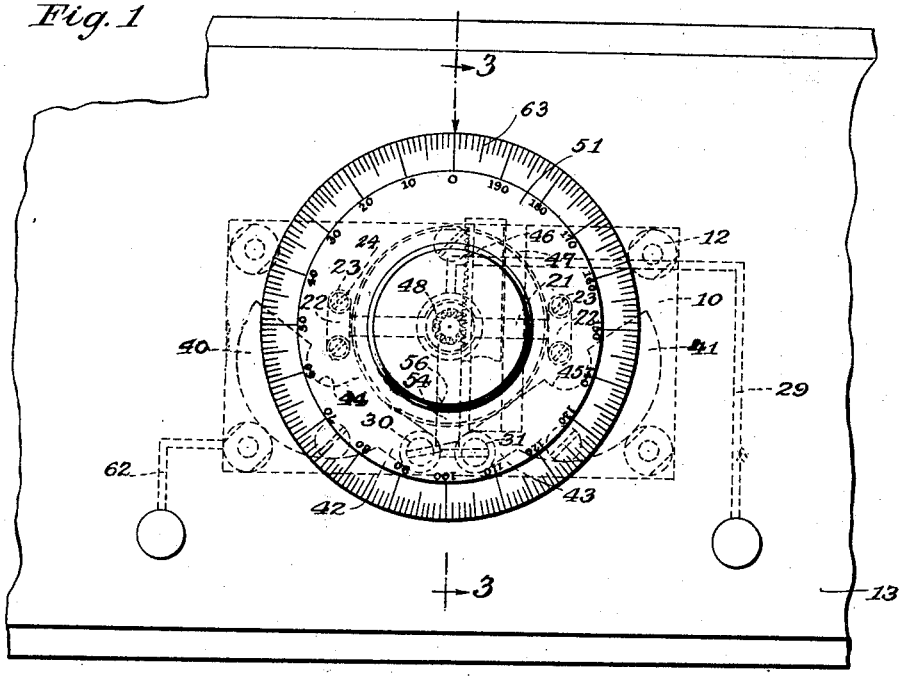
Fig. 1 is a front elevation of a portion of a radio panel, showing a condenser, according to one embodiment of the invention, attached thereto.

Referring to the drawings, the supporting frame of the condenser comprises metal front and rear plates 10 and 11, of rectangular shape, bolted together by bushed tie-rods 12 at the corners, the front plate adapted to be secured in spaced relation to a suitable panel 13 by screws 14 having spacer bushings 15 between the plate and the panel. The rear plate 11 is provided with a circular opening 16 of slightly greater diameter than the stationary plates 17 of the circular stator. These plates 17 are spaced apart by central spacing portions 18, and are preferably formed integral therewith with a threaded shank 19 at the rearward end, which is adapted to be engaged in an aperture 20 of a transverse supporting bar 21 spanning the opening 16 and having its end portions 22 secured to the plate 11 at each side of said opening by screws 23, the supporting bar being insulated from the plate and said screws 23 by insulation discs 24 and bushings 25, this being the only insulation employed in the condenser. A spacer collar 26 is provided on the shank 19 between the supporting bar and the end stator plate, and the shank is tightly secured to the bar by a nut 27, and beneath which nut the terminal 28 of a conductor wire 29 is held. With this construction, it will be seen that the stator and its supporting bar are effectually insulated from the rest of the structure, and may be readily assembled to the frame by passing the same through the opening 16 and securing the screws 23.

Figure 2:
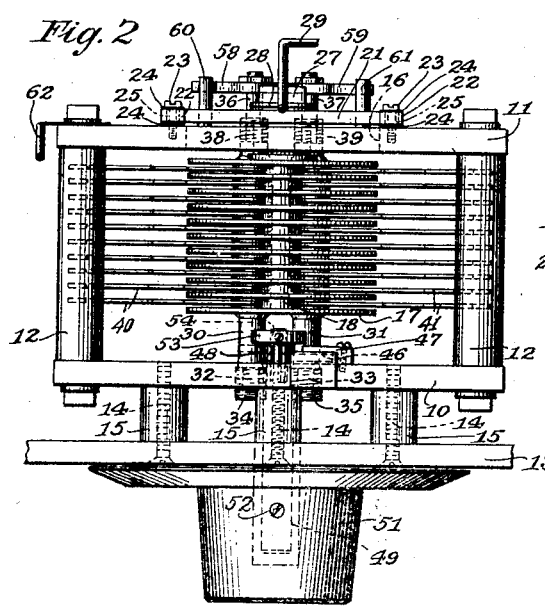
Fig. 2 is a plan view of the condenser.
Figure 3:
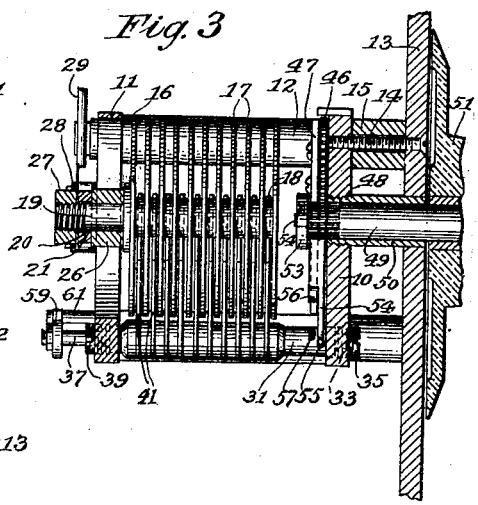
Fig. 3 is a vertical sectional view, taken along the line 3—3 of Fig. 1.

Beneath the stator there are provided a pair of horizontal spaced parallel shafts 30 and 31, having their forward reduced ends 32 and 33 rotatably engaged in tubular exteriorly threaded bearings 34 and 35 screwed in openings in the plate 10, and having their rearward reduced ends 36 and 37 engaged in similar tubular bearings 38 and 39 secured in the plate 11, said ends 36 and 37 projecting rearwardly from the bearings, as shown in Figs. 2 and 3, for a purpose hereinafter more fully referred to.

The shafts 30 and 31 respectively carry a series of spaced plates 40 and 41, of substantially semi-circular shape, having downwardly projecting portions 42 and 43 at their lower ends for connection to the shafts, and provided with arcuate cut-out portions 44 and 45, respectively, along their straight edges, adapted in the fully engaged position with the stator to embrace the spacer portions 18 in spaced relation. These plates 40 and 41 are adapted upon rotation of their shafts to enter the spaces between the stator plates 17 with relatively narrow air-gaps between their surfaces, the plates at one side being first moved to fully engaged relation, and the movement of the other plates being started as the first plates complete their movement.

The means for operating the movable plates comprises a vertically disposed rack 46 slidably mounted in a slide-way 47 secured to the plate 10, and having the pinion end 48 of the dial shaft 49 meshed therewith, said shaft being disposed in a tubular bearing 50 screwed into an opening of the plate 10 and extending into an opening of the panel 13. The dial 51 is secured to the shaft by a set-screw 52, and the shaft is held against longitudinal movement by a collar 53 removably secured upon its reduced inner end 54, and of such diameter as to bear upon the outer surface of the slide-way 47.

An off-set vertical extension 54 is provided at the lower end of the rack, which is adapted as the rack is raised and lowered to move between the shafts 30 and 31, the lower end of the extension engaging a radial pin 55 secured in the shaft 31, while a projectcam surface 56, disposed substantially midway of the extension is adapted to engage a radial pin 57 of the shaft 30, this latter pin being offset rearwardly from the pin 55, as shown in Fig. 3.

Upon the reduced ends 36 and 37 of the shafts 30 and 31, there are secured coil springs 58 and 59, the ends of which are engaged beneath pins 60 and 61 secured in the plate 11.

A conductor wire 62 is connected to one of the posts 12, the all-metal structure of the frame acting as a conductor from said wire to the plates 40 and 41. This wire 62, as well as the wire 29, is connected in the radio set in the usual manner.

Figure 4:
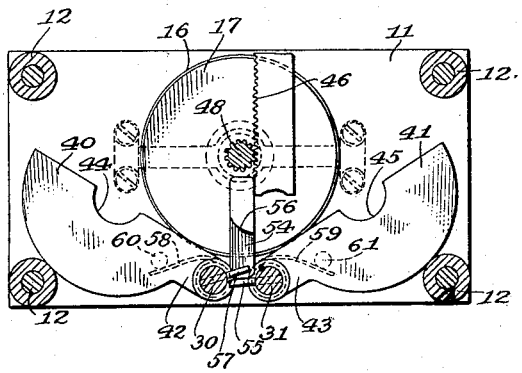
Figs. 4, 5 and 6 are interior elevational views, partly in section, and showing the movable plates respectively in fully disengaged position, partly engaged position, and fully engaged position.
Figure 5:
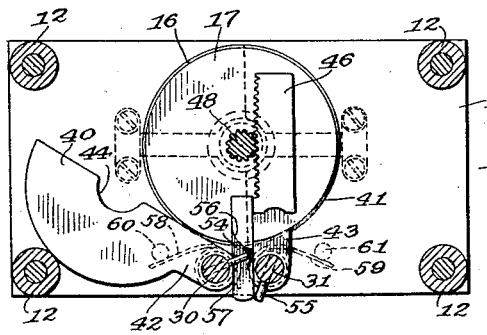
Figure 6:
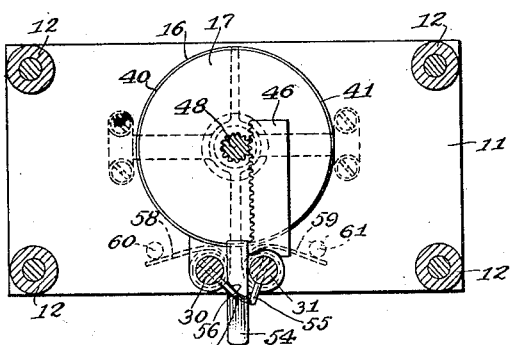

The dial 51 is graduated, as at 63, about its entire periphery, the relation between the pinion 48 and the rack 46 being such that a complete revolution of the dial moves the rack from its uppermost position, Fig. 4, to its lowermost position, Fig. 6. As the rack moves downwardly the end of the extension 54 depresses the pin 55, gradually moving the plates 41 into relation with the plates 17, this movement continuing until the dial has made a half revolution and said plates are fully engaged in the spaces between the stator plates, as shown in Fig. 5. At this point in the movement of the dial, the cam surface 56 engages the pin 57, moving the plates 40 gradually into relation with the stator plates until the same are fully engaged, as in Fig. 6, upon completion of a full revolution of the dial. Upon reverse movement of the dial, the plates 40 and 41 are moved to their disengaged position, the springs 58 and 59 causing the same to positively follow the movement of the rack. It will be understood that in any position of adjustment of the plates, the friction of the co-related parts will maintain said position. In the disengaged position, Fig. 4, the plates 40 and 41 are limited in their position by engagement with the lower posts 12 of the frame.

Figure 7:
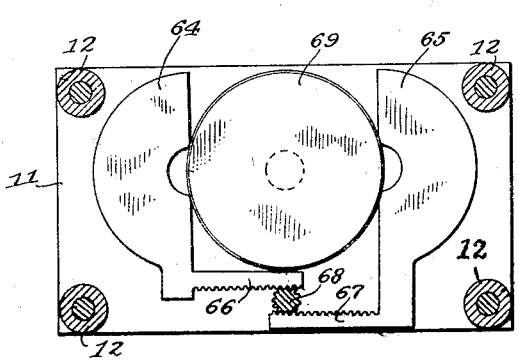
Fig. 7 is an interior elevational view, partly in section, of a modified form of the invention.

In Fig. 7 I have illustrated a modified form of the invention, in which the movable plates 64 and 65, of substantially semi-circular shape, are provided with horizontally extending opposed racks 66 and 67, engaged by a pinion 68 between them, and which is adapted to be rotated by a dial. It is obvious that by turning the dial the two sets of movable plates are simultaneously moved into relation with the stator plates 69, and are similarly moved out of relation by turning the dial in reverse direction. Suitable gearing may be employed with this type of laterally sliding plates, by which the plates 64 are first moved into full relation, and thereupon the plates 65 are moved into full relation. A suitable means for this purpose might consist of two gears, meshing with the respective racks, and adapted to be rotated, one after the other by vertically moving cam means such as shown in the first embodiment of the invention.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. In a variable condenser, a single series of spaced stator plates, a plurality of series of spaced movable plates adapted to be moved into relation with said first plates, each series occupying a different segment of the spaces between said first plates, each series having a number of plates corresponding to the number of said spaces, and means for moving said movable plates into and out of relation with said first plates.

2. In a variable condenser, a single series of spaced circular stator plates, two series of spaced movable plates of substantially semi-circular shape adapted to be moved into relation with said stator plates, each occupying a different segment of the spaces between said stator plates, each series having a number of plates corresponding to the number of spaces, and means for moving said movable plates into and out of relation with said first plates.

3. In a variable condenser, a series of spaced stator plates, a plurality of series of spaced movable plates adapted to be moved into relation with said stator plates, each series occupying a segment of each of the spaces between said stator plates, and means having engaging movement in one direction and disengaging movement in the other for moving said respective series of movable plates, one after the other, into and out of relation with said stator plates, the movement of the succeeding series starting after completion of the movement of the first series.

4. In a variable condenser, a metal frame, including a pair of spaced members and connection means between them, one of said members having an opening therein, a removably mounted support secured to said member and spanning said opening, a series of spaced stator plates mounted on said support and adapted to be engaged in and disengaged from said frame through said opening, means insulating said stator plates from said frame, a series of spaced movable plates mounted in said frame adapted to be moved into and out of relation with said stator plates, and means for moving said movable plates.

5. In a variable condenser, a series of spaced stator plates, a plurality of series of spaced movable plates adapted to be moved into and out of relation with said stator plates, each series occupying a segment of the spaces between said stator plates, a dial, and means adapted to be operated by the movement of said dial in one direction to successively move said respective series of plates into relation with said stator plates, the movement of the succeeding series starting upon completion of the movement of the first series.

6. In a variable condenser, a series of spaced stator plates, a plurality of series of spaced movable plates adapted to be moved into and out of relation with said stator plates, each series occupying a different segment of the spaces between said stator plates, a dial, rack means adapted to impart movement to said movable plates, and a pinion carried by said dial meshing with said rack means.

7. In a variable condenser, a series of spaced stator plates, a plurality of series of spaced movable plates adapted to be moved into and out of relation with said stator plates, each series occupying a segment of the spaces between said stator plates, a movable member having spaced means thereon adapted through movement in one direction to successively move said respective series of movable plates, the movement of the succeeding series starting upon completion of the movement of the first series.

8. In a variable condenser, a series of spaced stator plates, two series of spaced movable plates mounted on spaced parallel axes beneath said stator plates, and adapted to be moved into and out of relation with said stator plates, each series occupying a different segment of the spaces between said stator plates, a sliding rack member mounted for movement between said axes, means on said rack member adapted to rotate said movable plates into and out of relation with said stator plates, a dial, and a pinion carried by said dial meshing with said rack, and adapted upon rotation of said dial to move said rack.

9. In a variable condenser, a series of spaced stator plates, two series of spaced movable plates mounted on parallel axes beneath said stator plates, and adapted to be moved into and out of relation with said stator plates, each series occupying a different segment of the spaces between said stator plates, a sliding member mounted for movement between said axes and having spaced actuating means, and means fixed to said plates adapted to be successively engaged by said actuating means through the movement of said member to successively move said respective series of movable plates.

10. In a variable condenser, a series of spaced stator plates, a series of spaced movable plates adapted to be moved into and out of relation with said stator plates, means for limiting the disengaged position of said movable plates, means for moving said plates into relation with said stator plates, and spring means adapted to yieldably maintain said movable plates in relation with said limiting means and impart disengaging movement to said movable plates.

11. In a variable condenser, a series of spaced stator plates, a plurality of series of spaced movable plates adapted to be moved into and out of relation with said stator plates, each series occupying a segment of the space between said stator plates, a dial, and means between said dial and said series of spaced movable plates adapted through a single complete rotation of said dial to move said plurality of series of movable plates into complete engaging relation with said stator plates.

Signed at Waterbury in the county of New Haven and State of Connecticut this 14th day of May A. D., 1924.

THOMAS E. WHITE.